United States Patent Office 2,863,785
Patented Dec. 9, 1958

2,863,785

THERMALLY STABLE BITUMINOUS BONDING MATERIALS

Murray Jelling, Whitestone, N. Y.

No Drawing. Application November 19, 1953
Serial No. 393,243

22 Claims. (Cl. 106—273)

This invention relates to bituminous compositions of the type that are mixed with mineral aggregates in the construction of asphalt pavements. More particularly the invention relates to a novel group of bonding agents which are adapted to be incorporated in such bituminous compositions and when so incorporated not only improve the bonding effectiveness of the bituminous composition but also exhibit improved thermal stability as compared with the bonding agents previously used.

During the development of the art of improving the coating and bonding qualities of bituminous compositions when mixed with mineral aggregates in the construction of asphalt pavements, several types of chemical agents have been proposed and used. The use of these agents has made it possible to use wet aggregates in preparing paving mixtures, thereby obviating the necessity of having available dry aggregates. Thus, attendant delays in road construction have been eliminated. Also, the incorporation of bonding agents has permitted the use of hydrophilic aggregates, which could not otherwise be employed. In addition the incorporation of these chemical bonding agents has brought about an improvement in the structural stability of the finished bituminous pavement by increasing the resistance to separation of aggregate and bitumen caused by the detrimental action of water.

Thus, these agents have been useful in improving the method of asphalt road construction and in improving the quality and length of service of the finished pavement.

Chemical bonding agents of several types have been proposed and used, such as metallic soaps, fatty acids, surface active amines, amine soaps, and acylamidoamines and their soaps. The most useful, from the point of view of effectiveness, ease of application, and cost, have been those based on compositions of surface active organic amines such as described in patents to Louis A. Mikeska: No. 2,389,680, issued November 27, 1945; and James M. Johnson, Francis L. Mark and Murray Jelling: No. 2,514,954, issued July 11, 1950. The value of bonding agents, such as aminoalkylamides, polyaminoalkylamides, and their carboxylic acid salts, has been fully demonstrated in improving the coating of wet aggregates, bonding of bituminous materials to aggregates, and improving the long range stability of finished pavements by increasing the resistance to separation of aggregate and bitumen in the presence of water.

In many instances it is common practice to store the bituminous composition in tanks at an elevated temperature, 250–400° F., and maintain it in a fluid state, so that the composition may be readily removed without reheating, which would be necessary if the bituminous composition were allowed to cool and solidify. The period of storage may be as long as 14 days. As required, the asphalt is withdrawn and handled as is or mixed with hydrocarbon diluents in preparing cutback asphalts.

In other instances, quantities of asphalt or like bitumen are heated as high as 400–500° F. at the time of shipment so that its temperature upon arrival at the point of destination will have dropped to about 300–350° F., which is the desirable temperature required for proper application in preparing the paving mixture.

It has recently become apparent that many conventional types of bonding agents lose their effectiveness in a very short time when subjected to these high temperatures, i. e., temperatures in the range normally encountered with the storing and handling of bituminous materials. When the above described bonding agents are subjected to these high temperature conditions, their effectiveness is consequently lost in a short time and they are of little value as bonding agents.

As an example of this loss of effectiveness, samples of penetration grade asphalts containing a sufficient quantity of bonding agent to produce the desired coating, bonding, and resistance to the stripping action of water, were maintained at 325° F. for 24 hours. When paving mixtures were made, allowed to cure, and then immersed in water, the lack of resistance to stripping was readily apparent as compared to similar preparations, where the treated asphalts were not subjected to a high temperature, but were used in preparing the paving mixtures immediately after adding the bonding agent. As another example, when the treated penetration asphalts, after being maintained at 325° F. for 24 hours, were converted to cutback asphalts by adding petroleum naphtha, they were ineffective in coating wet stone and forming durable bonds with aggregates. By comparison, similarly treated samples, not subjected to the prolonged high temperature, upon conversion to cutback asphalts in a similar manner, were effective in coating wet stone, forming durable bonds with aggregates, and resisting the stripping action of water upon immersion of the paving mixtures in water.

In my prior application Serial No. 196,929 it was disclosed that the foregoing difficulties can be overcome by using as bonding agents certain N-dialkylaminoalkyl-amides and their carboxylic acid salts. Such bonding agents not only improve substantially the bonding effectiveness of bituminous compositions but also are sufficiently stable thermally to withstand the elevated temperatures frequently encountered in the processing of such bituminous compositions.

In my prior application a group of N-dialkylamino-alkylamides and their salts was disclosed wherein the amide-forming and salt-forming acids were selected from the group of fatty acids and rosin acids. It has now been found that a similar combination of bonding effectiveness and thermal stability can be achieved by using certain naphthenic acid derivatives of the dialkylaminoalkyl-amines as described below. As in the case of the compounds disclosed in my parent application the amides themselves can be used, although the carboxylic acid salts of the amides are rather more effective. The term "naphthenic acid" as used herein refers to a class of carboxylic acid derivatives of naphthenes which are isolated from petroleum by petroleum refiners and sold commercially as naphthenic acids. "Naphthenyl radical" or "naphthenyl group" refers to the acyl radical of such acids.

Suitable N-dialkylaminoalkylamides of the indicated type are represented by the general formula:

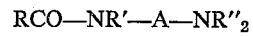

RCO—NR′—A—NR″₂ where RCO is a naphthenyl group; A is an alkylene group containing 2 to 6 carbon atoms; R′ represents a hydrogen atom or an alkyl group containing 1 to 4 carbon atoms; and R″ represents an alkyl group containing 1 to 4 carbon atoms. In the above formula the two R″ groups may be the same or different.

Typical compounds that come within the scope of the above formula and are useful in accordance with the present invention are RCONHCH$_2$CH$_2$CH$_2$N(CH$_3$)$_2$ named N-(3-dimethylamino propyl) naphthenamide

RCONHCH$_2$CH$_2$N(CH$_3$)$_2$ named N-(2-dimethylamino ethyl) naphthenamide

RCONHCH$_2$CH$_2$N(C$_4$H$_9$)$_2$ named N-(2-dibutylamino ethyl) naphthenamide

RCON(CH$_3$)C$_6$H$_{12}$N(C$_2$H$_5$)$_2$ named N-methyl-N-(6-diethylamino hexyl) naphthenamide, and RCON(C$_3$H$_7$)CH$_2$CH$_2$N(CH$_3$)C$_3$H$_7$ named N-isopropyl-N-(2-methylisopropylamino ethyl) naphthenamide.

As indicated above the preferred compounds for use in accordance with the present invention are the carboxylic acid salts of the amides referred to above and more particularly the salts represented by the general formula:

RCO—NR'—A—NR''$_2$.HO—OCR wherein RCO is an acyl radical of an acid selected from the group consisting of C$_{12}$ to C$_{20}$ fatty acids, rosin acids and naphthenic acids, and at least one of the RCO groups is a naphthenyl radical. In this general formula R', R'' and A are the same as in the general formula for the amides previously given.

Typical compounds falling within the scope of this general formula and useful in accordance with the present invention are RCONHCH$_2$CH$_2$CH$_2$N(CH$_3$)$_2$.HOOCR named the naphthenic acid salt of N-(3-dimethylamino propyl) naphthenamide

C$_{17}$H$_{33}$CONHCH$_2$CH$_2$CH$_2$N(CH$_3$)$_2$.HOOCR named the naphthenic acid salt of N-(3-dimethylamino propyl) oleamide

RCONHCH$_2$CH$_2$CH$_2$N(CH$_3$)$_2$.HOOCC$_{17}$H$_{33}$ named the oleic acid salt of N-(3-dimethylamino propyl) naphthenamide, C$_{17}$H$_{33}$CONHCH$_2$CH$_2$N(CH$_3$)$_2$.HOOCR named the naphthenic acid salt of N-(2-dimethylamino ethyl) oleamide

C$_{11}$H$_{23}$CONHCH$_2$CH$_2$CH$_2$N(C$_3$H$_7$)$_2$.HOOCR named the naphthenic acid salt of N-(3-diisopropylamino propyl) lauramide

C$_{17}$H$_{31}$CON(CH$_3$)CH$_2$CH$_2$N(CH$_3$)C$_3$H$_7$.HOOCR named the naphthenic acid salt of N-methyl-N-(2-methylisopropylamino ethyl) linoleamide, and

RCON(C$_4$H$_9$)C$_4$H$_8$N(C$_4$H$_9$)$_2$.HOOCC$_{17}$H$_{33}$ named the oleic acid salt of N-butyl-N-(4-dibutylamino butyl) naphthenamide.

It should be noted that both types of compounds contain a tertiary amine group and an amide group and it is this particular structure which is believed to impart to the compounds their desired characteristics.

In preparing the N-dialkylaminoalkylamides and their carboxylic acid salts, organic acids are reacted with dialkylaminoalkylamines. Representatives of the class of these amines are: (CH$_3$)$_2$NCH$_2$CH$_2$CH$_2$NH$_2$ named 3-dimethylaminopropylamine, (CH$_3$)$_2$NCH$_2$CH$_2$NH$_2$ named 2-dimethylaminoethylamine, (CH$_3$)$_2$NCH$_2$CH$_2$NHCH$_3$ named 2-dimethylaminoethyl methylamine, (C$_4$H$_9$)$_2$NCH$_2$CH$_2$CH$_2$CH$_2$NHC$_4$H$_9$ named 4-dibutylaminobutyl butylamine, and

C$_3$H$_7$(CH$_3$)NCH$_2$CH$_2$NHCH$_3$ named 2-methylisopropylaminoethyl methylamine.

Representative of the organic acids that may be used are oleic, linoleic, linolenic, lauric, palmitic, and stearic acids, as well as rosin acids, naphthenic acids or mixtures of any of these acids; e. g. tall oil. Triglycerides, such as vegetable and fish oils and animal fats, may be used as ingredients to supply the fatty acids required in carrying out the chemical preparation.

In preparing the N-dialkylaminoalkylamides, one mol of organic acid and one mol of dialkylaminoalkylamine are mixed together and heated at 100–200° C. in a suitable container with suitable agitation. Upon mixing, the amine salt of the organic acid is formed and during the heating process the salt is molecularly dehydrated forming one mol of the N-dialkylaminoalkylamide with the elimination of one mol of water, as follows:
Reaction on mixing:

$$RCOOH + NHR'—A—NR''_2 \rightarrow$$
$$RCOOH.NHR'—A—NR''_2 \quad (1)$$

and $$RCOOH + NHR'—A—NR''_2 \rightarrow$$
$$RCOOH.NR''_2—A—NHR' \quad (2)$$

Reaction upon heating:
(1) → RCO—NR'—A—NR''$_2$ + H$_2$O
(2) → (1) → RCO—NR'—A—NR''$_2$ + H$_2$O The course of the reaction and its completion may be followed by noting the diminishing proportion of carboxylic acid by titration with standard alkali and the diminishing proportion of titratable amine with standard acid. At the completion of the reaction there is substantially no organic acid present and the titratable alkali has been reduced to substantially one-half of its original value. The measurement of the eliminated water may also be useful as a guide in determining the completion of the reaction.

In preparing the carboxylic acid salts of the N-dialkylaminoalkylamides, equimolecular proportions of the N-dialkylaminoalkylamide and the organic acid are mixed together at any suitable temperature at which the components are liquids:

$$RCO—NR'—A—NR''_2 + RCOOH \rightarrow RCO—$$
$$NR'—A—NR''_2.HOOCR$$

Alternatively, all reactions may be carried out concurrently by mixing one mol of dialkylaminoalkylamine and two mols of organic acid and reacting the mixture at 100–200° C. in a suitable container with suitable agitation:

$$2RCOOH + NHR'—A—NR''_2 \rightarrow RCOOH.NHR'—$$
$$A—NR''_2.HOOCR \quad (1)$$

$$(1) \rightarrow RCO—NR'—A—NR''_2.HOOCR + H_2O$$

Surface active bonding agents prepared as described above may be utilized with any type of thermoplastic bituminous material, such as petroleum derived asphalts, tars, natural asphalts, road oils, asphalt and tar cutbacks prepared with hydrocarbon diluents and pitches obtained from all types of distillation or extraction residues. These surface active agents are readily dispersed in bituminous materials when all components are in the fluid state. For effective coating of wet aggregates with the treated bituminous composition, the thermally stable, surface active agent is added in the proportions of approximately 0.5 to 5.0 parts by weight per 100 parts of bituminous material.

Bituminous compositions incorporating the bonding agents of the present invention can be used in the preparation of paving compositions containing all of the usual types of aggregates such as gravel, crushed stone, sand or slag in either wet or dry condition. Also these agents are useful in the coating or bonding with bituminous compositions of other types of surfaces, such as metal, glass, wood, ceramics, plastics and paper, particularly when the surface to be treated is wet, or when the treated material is to be exposed to water under conditions which tend to cause a loss of strength of the bituminous bond.

In order to point out more fully the nature of the present invention the following illustrative examples are given of typical methods of preparing the amides and salts of the present invention:

*Example 1.*—One mol of 3-dimethylaminopropylamine and one mol of oleic acid were mixed and heated slowly to 150° C. and maintained at 150° to 160° C. with constant agitation for four hours. During heating of the mixture approximately one mol of water distilled therefrom. The reaction product was a brown liquid having an acid value of 15 and a base value of 156 and hence consisted essentially of $C_{17}H_{33}CONHCH_2CH_2CH_2N(CH_3)_2$, that is N-(3-dimethylamino propyl) oleamide. The product was found to boil at approximately 240° to 245° C. at 3 mm. absolute and had a refractive index of 1.468 at 30.8° C.

The product as prepared above was mixed with one mol of naphthenic acid and agitated for about 15 minutes to insure complete reaction between the naphthenic acid and the amide to form the naphthenic acid salt of the amide.

The salt as thus prepared was tested in asphalt in the following manner: 100 parts by weight of 85 to 100 penetration asphalt cement was heated to 140° C. and 1.3 parts by weight of the naphthenic acid salt thoroughly mixed therewith. The resulting composition was placed in an oven at 175° to 180° C. for a period of 5 days. Thereafter, the asphalt composition was removed from the oven and converted to a cut-back asphalt designated as RC–2 by blending 75 parts thereof with 25 parts by weight of V. M. P. naphtha, after which it was used to coat a standard aggregate.

The aggregate used was a Massachusetts Rhyolite of ⅜″ to ¼″ size which had been washed free of fines and dried. 200 parts by weight of this aggregate was placed in a container and moistened with 4 parts of distilled water. Thereafter, 12 parts by weight of the RC–2 asphalt composition was mixed with the aggregate continuously for about 5 minutes with the object of coating the entire surface of the aggregate with the asphalt composition. With the indicated proportions of asphalt composition and aggregate it was found that the asphalt completely coated the surfaces of the aggregate particles.

The coated aggregate was allowed to cure in air for one hour and then immersed in water for a period of an hour. At the end of this time it was inspected and it was found that the surface of the aggregate was still substantially completely coated with the asphalt composition.

*Example 2.*—One mol of 3-dimethylamino propylamine and one mol of naphthenic acid were mixed and heated as in Example 1 to form N-(3-dimethylamino propyl) naphthenamide. The resulting naphthenamide was then mixed with one mol of oleic acid to form the oleic acid salt.

This salt was tested in asphalt in the manner described in Example 1 except that one part by weight instead of 1.3 parts by weight of the salt was mixed with the asphalt. It was found that the oleic acid salt of the naphthenamide initially coated about 80% of the surface of the aggregate, and after water immersion about 70% of the surface area of the aggregate remained coated.

*Example 3.*—One mol of 3-dimethylamino propylamine was mixed with two mols of naphthenic acid and heated at 150°–160° C. for a period of 5 hours during which time approximately one mol of water was distilled from the reaction mixture. The resulting product which was a naphthenic acid salt of N-(3-dimethylamino propyl) naphthenamide was tested in asphalt as described in Example 1.

The asphalt composition containing this salt initially coated about 70% of the surface area of the aggregate and after water immersion it was found that approximately 50% of the surface area of the aggregate remained coated.

*Example 4.*—The procedure of Example 3 was followed except that 3-dibutylamino propylamine was used instead of the 3-dimethylamino propylamine of Example 3. The naphthenic acid salt of N(3-dibutylamino propyl) naphthenamide thus formed was incorporated in asphalt to the extent of about 3% by weight. The asphalt composition was heated at about 180° C. for 5 days and its ability to coat wet aggregate determined as described in Example 1. It was found that the asphalt composition initially coated 100% of the surface area of the aggregate and that 90% of the area remained coated after water immersion.

*Example 5.*—An oleic acid salt of N(3-dibutylamino propyl) naphthenamide was made by heating substantially equimolar quantities of 3-dibutylamino propylamine and naphthenic acid to form a napthenamide which was then reacted with oleic acid to form the oleic acid salt of the amide. An asphalt composition containing 3% by weight of this salt was tested as described in the preceding examples and was found to coat initially 100% of the surface area of the aggregate. After water immersion about 95% of the coating was retained.

*Example 6.*—The procedure of Example 5 was followed except that rosin acids were substituted for the oleic acid of Example 5 to form a rosin acid salt of N(3-dibutylamino propyl) naphthenamide. Asphalt containing 3% by weight of this salt when tested initially coated 100% of the aggregate surface and after water immersion about 90% of this coating was retained.

It is of course to be understood that the foregoing examples are illustrative only and that numerous amides and salts other than those specifically referred to fall within the scope of the general formulae given above and can be incorporated in asphalt to achieve the advantages outlined at the beginning of the present specification.

I claim:

1. As a new composition of matter, a compound selected from the group consisting of N-dialkylaminoalkylamides corresponding to the general formula:

RCO—NR′—A—NR″$_2$ and their carboxylic acid salts corresponding to the general formula:

RCO—NR′—A—NR″$_2$·HO—OCR where the RCO group of the amide and one of the RCO groups of the salts is a naphthenyl radical and the other RCO group of the salt is an acyl radical of an acid selected from the group consisting of $C_{12}$–$C_{20}$ fatty acids, rosin acids and naphthenic acids; A is an alkylene radical containing from 2 to 6 carbon atoms; R′ is selected from the group consisting of hydrogen and alkyl radicals containing from 1 to 4 carbon atoms; and R″ is an alkyl radical containing from 1 to 4 carbon atoms.

2. As a new composition of matter, an N-dialkylaminoalkylamide having the general formula:

RCO—NR′—A—NR″$_2$ where RCO is a naphthenyl radical; A is an alkylene radical containing 2 to 6 carbon atoms; R′ is selected from the group consisting of hydrogen and alkyl radicals containing from 1 to 4 carbon atoms; and R″ is an alkyl radical containing from 1 to 4 carbon atoms.

3. As a new composition of matter, a salt of an N-dialkylaminoalkylamide having the general formula:

RCO—NR′—A—NR″$_2$·HO—OCR where one of the RCO groups is a naphthenyl radical and the other RCO group is an acyl radical of an acid selected from the group consisting of $C_{12}$–$C_{20}$ fatty acids, rosin acids and naphthenic acids; A is an alkylene radical containing from 2 to 6 carbon atoms; R′ is selected from the group consisting of hydrogen and alkyl radicals containing from 1 to 4 carbon atoms; and R″ is an alkyl radical containing from 1 to 4 carbon atoms.

4. A compound according to claim 3 and wherein the amide-forming RCO group is a naphthenyl radical.

5. A compound according to claim 3 and wherein the RCO group of the salt-forming acid is a naphthenyl radical.

6. A compound according to claim 3 and wherein both RCO groups are naphthenyl radicals.

7. As a new composition of matter, the oleic acid salt of N-(3-dimethylaminopropyl) naphthenamide.

8. As a new composition of matter, the naphthenic acid salt of N-(3-dimethylaminopropyl) oleamide.

9. As a new composition of matter, the naphthenic acid salt of N-(3-dimethylaminopropyl) naphthenamide.

10. A bituminous composition containing a thermally stable bonding agent selected from the group consisting of N-dialkylaminoalkylamides corresponding to the general formula:

RCO—NR'—A—NR''$_2$ and their carboxylic acid salts corresponding to the general formula:

RCO—NR'—A—NR''$_2$·HO—OCR where the RCO group of the amide and one of the RCO groups of the salt is a naphthenyl radical and the other RCO group of the salt is an acyl radical derived from an acid selected from the group consisting of $C_{12}$–$C_{20}$ fatty acids, rosin acids and naphthenic acids containing from 2 to 6 carbon atoms; R' is selected from the group consisting of hydrogen and alkyl radicals containing from 1 to 4 carbon atoms; and R'' is an alkyl radical containing from 1 to 4 carbon atoms.

11. A bituminous composition containing a thermally stable bonding agent that is an N-dialkylaminoalkylamide having the general formula:

RCO—NR'—A—NR''$_2$ where RCO is a naphthenyl radical; A is an alkylene radical containing 2 to 6 carbon atoms; R' is selected from the group consisting of hydrogen and alkyl radicals containing from 1 to 4 carbon atoms; and R'' is an alkyl radical containing from 1 to 4 carbon atoms.

12. A bituminous composition containing a thermally stable bonding agent that is a salt of an N-dialkylaminoalkylamide having the general formula:

RCO—NR'—A—NR''$_2$·HO—OCR where one of the RCO groups is a naphthenyl radical and the other RCO group is an acyl radical of an acid selected from the group consisting of $C_{12}$–$C_{20}$ fatty acids, rosin acids and naphthenic acids; A is an alkylene radical containing from 2 to 6 carbon atoms; R' is selected from the group consisting of hydrogen and alkyl radicals containing from 1 to 4 carbon atoms; and R'' is an alkyl radical containing from 1 to 4 carbon atoms.

13. A composition according to claim 12 and wherein the amide-forming RCO group of the bonding agent is a naphthenyl radical.

14. A composition according to claim 12 and wherein the RCO group of the salt-forming acid of the bonding agent is a naphthenyl radical.

15. A composition according to claim 12 and wherein both RCO groups of the bonding agent are naphthenyl radicals.

16. A bituminous composition containing a thermally stable bonding agent which is the oleic acid salt of N(3-dimethylaminopropyl) naphthenamide.

17. A bituminous composition containing a thermally stable bonding agent which is the naphthenic acid salt of N(3-dimethylamino propyl) oleamide.

18. A bituminous composition containing a thermally stable bonding agent which is the naphthenic acid salt of N(3-dimethylamino propyl) naphthenamide.

19. As a new composition of matter, the naphthenic acid salt of N-(2-dimethylamino ethyl) oleamide.

20. As a new composition of matter, N-(3-dimethylamino propyl) naphthenamide.

21. A bituminous composition containing a thermally stable bonding agent which is the naphthenic acid salt of N-(2-dimethylamino ethyl) oleamide.

22. A bituminous composition containing a thermally stable bonding agent which is N-(3-dimethylamino propyl) naphthenamide.

References Cited in the file of this patent

UNITED STATES PATENTS

| | | |
|---|---|---|
| 1,534,525 | Hartmann et al. | Apr. 21, 1925 |
| 2,322,201 | Jayne et al. | June 15, 1943 |
| 2,386,867 | Johnson | Oct. 16, 1945 |
| 2,426,220 | Johnson | Aug. 26, 1947 |
| 2,508,924 | Mertens et al. | May 23, 1950 |
| 2,514,954 | Johnson | July 11, 1950 |
| 2,523,934 | Albrecht et al. | Sept. 26, 1950 |
| 2,609,381 | Goldstein et al. | Sept. 2, 1952 |
| 2,640,822 | Harman et al. | June 2, 1953 |
| 2,663,648 | Jelling | Dec. 22, 1953 |

FOREIGN PATENTS

| | | |
|---|---|---|
| 659,457 | Great Britain | Oct. 24, 1951 |

UNITED STATES PATENT OFFICE

CERTIFICATE OF CORRECTION

Patent No. 2,863,785                                      December 9, 1958

Murray Jelling

It is hereby certified that error appears in the printed specification of the above numbered patent requiring correction and that the said Letters Patent should read as corrected below.

Column 7, line 20, after "naphthenic acids" insert -- ; A is an alkylene radical --.

Signed and sealed this 10th day of March 1959.

(SEAL)
Attest:

KARL H. AXLINE
Attesting Officer

ROBERT C. WATSON
Commissioner of Patents